United States Patent [19]

Thayer et al.

[11] Patent Number: 4,501,118
[45] Date of Patent: Feb. 26, 1985

[54] CATALYTIC CONVERTER HOUSING

[75] Inventors: Timothy Z. Thayer, Hope; Frank W. Shaw, Columbus, both of Ind.

[73] Assignee: Arvin Industries, Inc., Columbus, Ind.

[21] Appl. No.: 494,611

[22] Filed: May 16, 1983

[51] Int. Cl.³ .................................................. F01N 3/28
[52] U.S. Cl. ..................................... 60/301; 422/171; 422/172
[58] Field of Search .................. 60/299, 301; 422/171, 422/172

[56] References Cited

U.S. PATENT DOCUMENTS

| | | | |
|---|---|---|---|
| 3,090,677 | 5/1963 | Scheitlin et al. | 60/288 |
| 3,740,197 | 6/1973 | Scheitlin et al. | 60/301 |
| 3,771,969 | 11/1973 | Scheitlin | 60/301 |
| 4,049,388 | 9/1977 | Scheitlin et al. | 60/301 |
| 4,218,422 | 8/1980 | Schock | 60/301 |
| 4,322,388 | 3/1982 | Hardin et al. | 422/177 |

*Primary Examiner*—Douglas Hart
*Attorney, Agent, or Firm*—Barnes & Thornburg

[57] ABSTRACT

A catalytic converter includes a longitudinally disposed body portion having first and second shell halves and an interior through which the combustion product can flow. A manifold is provided for forming a passageway between the body interior containing a reducing catalyst and the body interior containing an oxidizing catalyst. The manifold includes first and second manifold halves, with each manifold half including a pair of flanges which extend perimetrally and substantially completely along the interior wall of one shell half. The manifold flanges are disposed substantially parallel to the interior wall and coupled thereto. The manifold flanges include a portion which is recessed inwardly from the interior wall and first and second mating sections. The recessed portions include air holes for introducing air into the passageway between the reducing catalyst and the oxidizing catalyst. The first mating section includes a stud and the second mating section includes an aperture sized and positioned to receive the stud of the first mating section. Each shell half also includes a portion of the interior wall for attaching the pair of manifold flanges to the interior wall of the shell. This portion has a greater longitudinal extent than the longitudinal extent of the pair of manifold flanges.

10 Claims, 4 Drawing Figures

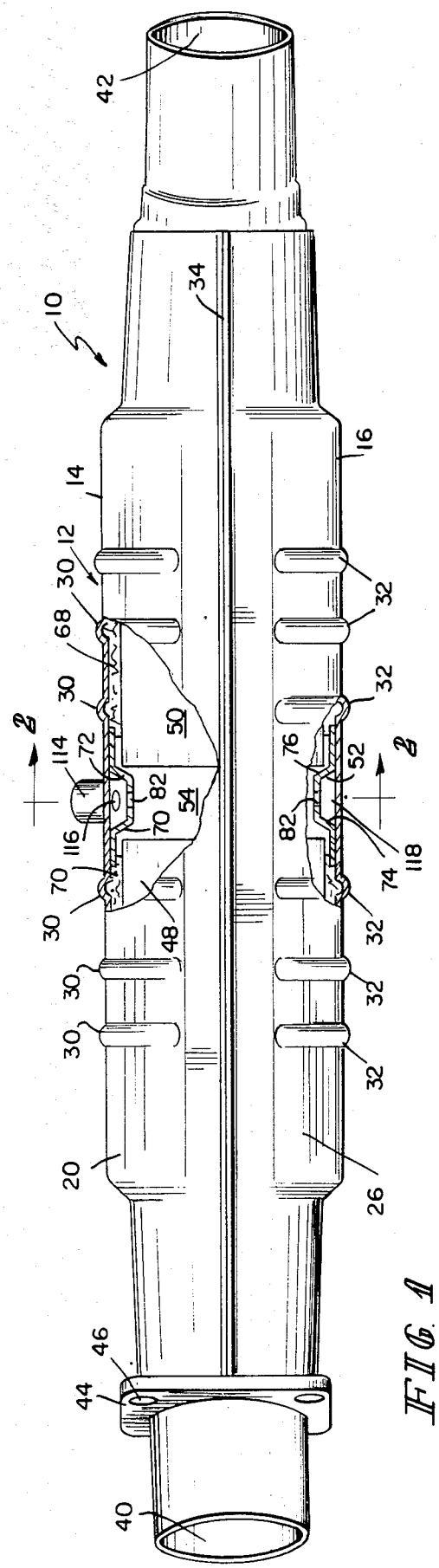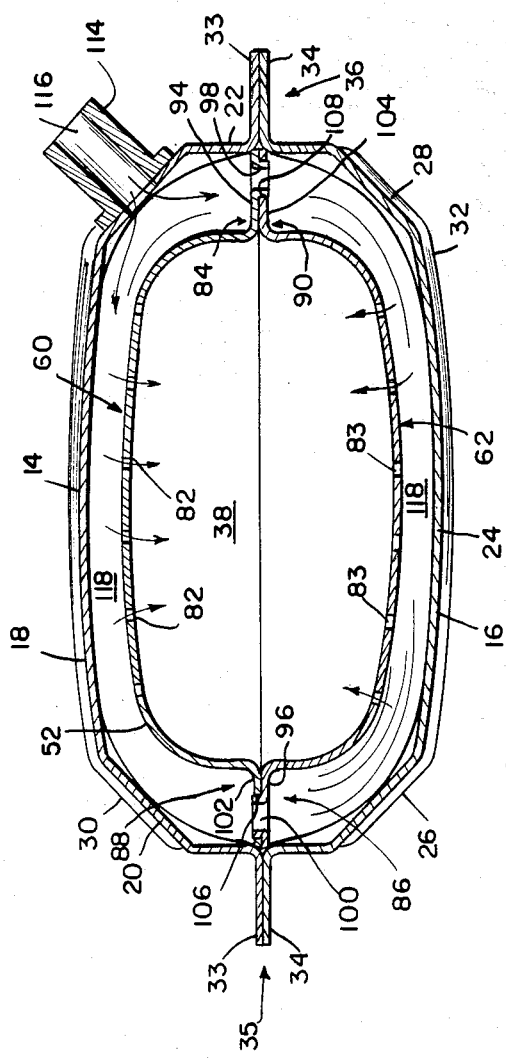

CATALYTIC CONVERTER HOUSING

This invention relates to catalytic converters and specifically to converters of the two-stage type. The invention particularly relates to catalytic converters having means for the introduction of non-combustion gases to enhance the oxidation of combustion gases. The invention is especially useful in exhaust gas treatment systems for vehicles powered by internal combustion engines.

Two-stage catalytic converters generally include a first, or reducing, catalyst and a second, or oxidizing, catalyst. Air is typically introduced into the combustion product gases passing through the converter after such gases have been treated in the reducing catalyst. An air pump is often provided for pumping air into the converter at an elevated pressure. The air, introduced into such gases before the combustion product is treated in the oxidizing catalyst, aids in oxidation of the combustion product. Two-stage catalytic converters of the type with which this invention deals are known in the prior art. See, for example, Scheitlin U.S. Pat. No. 3,771,969; Scheitlin et al. U.S. Pat. No. 3,740,197; and Scheitlin et al. U.S. Pat. No. 3,090,677.

Such two-stage catalytic converters include shells defining first and second housing portions. The second housing portion is downstream from the first in the path of combustion product flow through the shell. The first, upstream housing portion houses a substrate which presents, in the stream of combustion product flow past the substrate, a reducing catalyst. Typically, the purpose of such reducing catalyst is to reduce harmful and deleterious oxides, such as oxides of nitrogen, appearing in the combustion product into harmless gases, e.g., nitrogen and oxygen. The second, downstream shell portion houses a substrate which contains an oxidizing catalyst. Typically, the oxidizing catalyst is used to complete the oxidation of harmful and deleterious gases appearing in the combustion product as a result of incomplete combustion, e.g., carbon monoxide and unburned hydrocarbons, into harmless gases, e.g., carbon dioxide and water vapor.

As the aforementioned prior art patents disclose, an accepted practice in such two-stage converters is to introduce additional oxygen from an external source, e.g., atmospheric air outside the shell, into the shell downstream in the combustion product flow from the reducing site and upstream from the oxidizing site. The additional oxygen is used to oxidize the carbon monoxide and unburned hydrocarbons. The above-mentioned prior art references also disclose that the air is introduced into the catalytic converter through an "air tube" which extends transversely of the longitudinal axis of the converter between two opposed portions of the side wall thereof. The air tube, which in the prior art patents has an elongated cylindrical shape, is provided with a plurality of apertures located to provide some mixing of oxygen from the external source with the combustion product gases flowing into the oxidizing portion of the shell.

Scheitlin U.S. Pat. No. 4,049,388 relates to an improved means for introducing air into the combustion product flowing through the passageway between the reducing catalyst and the oxidizing catalyst. The air introduction means shown in this patent includes a manifold which extends perimetrally about at least a portion of the interior wall of the shell in this passageway. The manifold conforms to the interior of the wall of the shell in this passageway, and includes a plurality of apertures which open inwardly to direct a plurality of streams in the manifold into the stream of the combustion product flowing through this passageway. In one embodiment shown in the U.S. Pat. No. 4,049,388 patent, the manifold is adapted to a clam shell-type of converter. In this embodiment, the manifold includes a first and second manifold half, with each of the manifold halves being secured, before assembly of the clam shell, into a respective one of the shell halves.

Hardin et al. U.S. Pat. No. 4,322,388 relates to an improved structure for a clam shell-type converter wherein the side of the outer, perimetral flanges are reduced to save space in the converter.

The instant invention comprises an improved apparatus for introducing oxygen from an external source into the flowing streams of combustion product between the first, upstream reducing shell portion and the second, oxidizing downstream shell portion.

It is an object of the present invention to provide a shell structure which is adaptable to a wider variety of applications than previous shell structures.

It is also an object of the instant invention to provide a converter shell and manifold structure which is more durable and less likely to fail under stress than previously known converter shell and manifold structures.

In accordance with the instant invention, a catalytic converter includes a longitudinally disposed body portion having first and second shell halves and an interior through which the combustion product can flow. The body of the converter also includes an inlet through which the combustion product can flow into the interior of the body, and an outlet through which the combustion product can flow out of the interior of the body. A reducing catalyst is disposed in the interior of the body proximal to the inlet. An oxidizing catalyst is disposed in the interior of the body proximal to the outlet. Means are provided for forming a passageway between the body interior containing reducing catalyst and the body interior containing the oxidizing catalyst. The means includes first and second manifold halves, with each manifold half including a pair of flanges which extend perimetrally and substantially completely along the interior wall of one shell half. The manifold flanges are disposed substantially parallel to the interior wall and coupled thereto. The manifold flanges include a portion which is recessed inwardly from the interior wall and first and second mating sections. The recessed portions include means for introducing air into the passageway between the reducing catalyst and the oxidizing catalyst. Each shell half also includes a portion of the interior wall for attaching the pair of manifold flanges to the interior wall of the shell. This portion is generally continuous to allow selective placement of the manifold halves.

Preferably, the first mating section includes a stud and the second mating section includes an aperture. The aperture of the second mating section is sized and positioned to receive the stud of the first mating section.

One feature of the instant invention is that the body portion of the converter has no necked-down portion in the area of the body portion where the manifold is placed. It has been found that mechanical and thermal stress on the necked-down portion will often cause the converter to fail. Converter shell deterioration can be accelerated by the heat which builds up in this area. By eliminating the necked-down portion, a significant cause of catalytic converter failure can be reduced. Further, the use of a catalytic converter shell without a necked-down portion enables a single-sized shell to be used in a variety of applications. Converters for different vehicles often require different amounts of oxidizing catalyst and reducing catalyst. Also, the ratio of oxidizing catalysts to reducing catalysts will vary between different vehicles. Normally, the oxidizing catalyst will comprise between 30–70% of the total amount of catalyst, with the remainder consisting of reducing catalyst. The straight-sided converter shell of the instant invention allows the manufacturer to vary the placement of the manifold section in the interior of the shell. This feature enables the manufacturer to vary the relative amounts of reducing and oxidizing catalyst used in the converter, without forcing him to use a different-sized or shaped shell. The use of a single-sized and shaped shell can result in a cost saving to the manufacturer by eliminating the tooling cost which would be necessary to fabricate shells having different sizes.

It is also a feature of the instant invention that a manifold is formed through the use of a pair of inverted manifold halves. This use of identical manifold halves placed in a head-to-tail relation has the advantage of reducing tooling and inventory costs to the manufacturer by reducing the number of different parts which the manufacturer needs to fabricate.

Additional features and advantages of the instant invention will become apparent to those skilled in the art upon consideration of the following detailed description of a preferred embodiment exemplifying the best mode of carrying out the invention as presently perceived. The detailed description particularly refers to the accompanying figures in which:

FIG. 1 is a side view, partially broken away, of the instant invention;

FIG. 2 is a cross-sectional view taken along lines 2—2 of FIG. 1;

Figure 4:
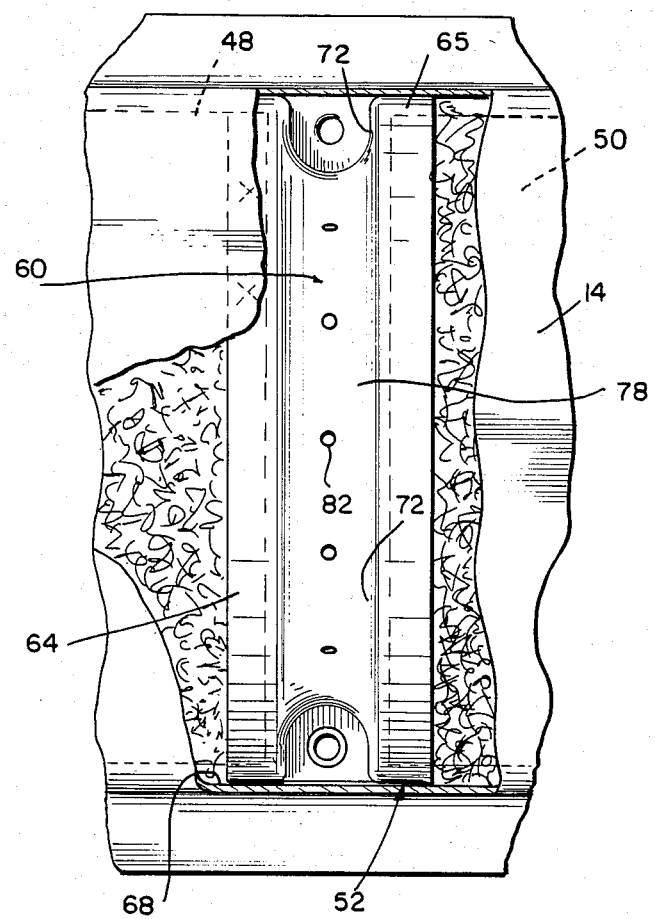
FIG. 4 is a partial, top planar view of the center section of the instant invention, partially broken away.
Figure 3:
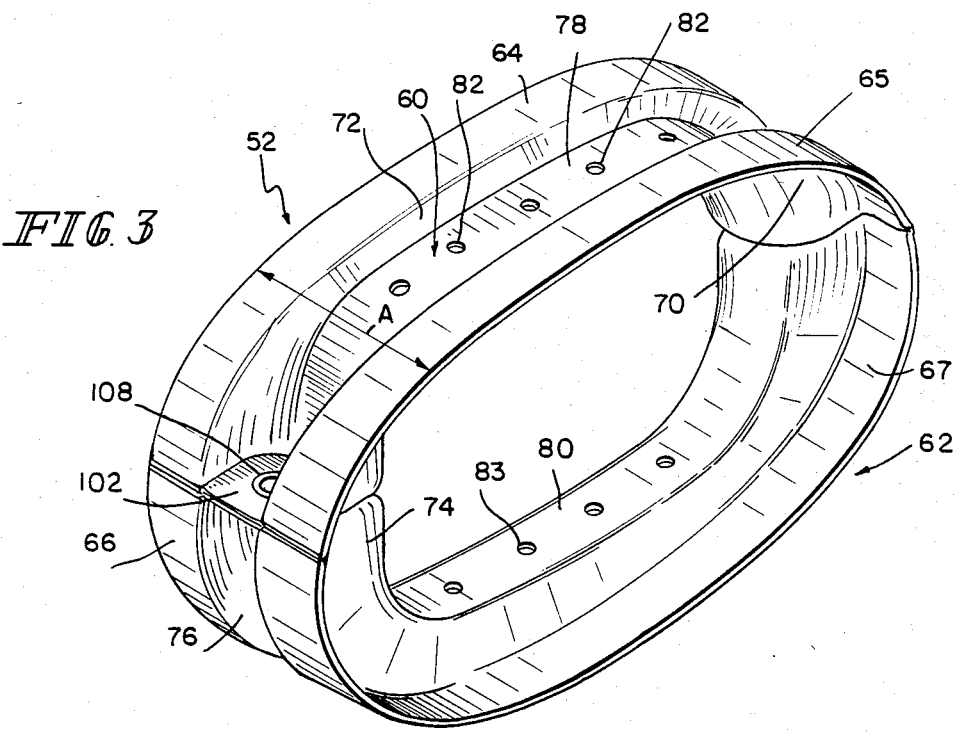
FIG. 3 is a perspective view of a manifold constructed according to the instant invention.

The catalytic converter 10 shown in FIGS. 1–4 includes a longitudinally disposed body portion 12. Body portion 12 includes a first, upper shell half 14 and a second, lower shell half 16. First, upper shell half 14 includes a generally horizontally disposed upper exterior surface 18 and generally vertically disposed side exterior surfaces 20, 22. Second, lower shell half 16 includes a generally horizontally disposed lower exterior surface 24 and generally vertically disposed side exterior surfaces 26, 28.

A series of exteriorly convex stiffening ridges 30, 32 are stamped on first shell half 14 and second shell half 16, respectively, in a direction generally transverse to the longitudinal extent of body portion 12. Stiffening ridges 30, 32 are stamped into shell halves 14, 16 to add rigidity to the body 12 of converter 10.

Each shell half 14, 16 includes a pair of outwardly disposed flanges 33, 34, respectively. The outwardly disposed flanges 33 of first shell half 14 are welded or otherwise joined to the outwardly disposed flanges 34 of second shell half 16 to form seams 35, 36 which join the first shell half 14 to the second shell half 16.

When first shell half 14 is joined to second shell half 16, the converter has an interior 38 through which a combustion product can flow. An inlet 40 is provided at one end of body 12 through which the combustion product can flow into the interior 38 of body 12. An outlet 42 is disposed at the opposite end of body 12 through which the combustion product can flow out of the interior 38 of body 12. A mounting bracket 44 having a plurality of mounting holes 46 is provided near the inlet 40 end for mounting the converter 10 to a portion of the vehicle or to another portion of the exhaust system of the vehicle. A reducing catalyst 48 is disposed in the interior 38 of the body proximal to inlet 40. An oxidizing catalyst 50 is disposed in the interior 38 of the body 12 converter 10 proximal to the outlet 42 end of body 12.

A means such as manifold 52 provides a passageway 54 between the portion of the body interior 38 containing the reducing catalyst 48 and the portion of the body interior 38 containing the oxidizing catalyst 50. Manifold 52 includes a first manifold half 60 and a second manifold half 62. Manifold halves 60, 62 are preferably identical and inverted to place the halves 60, 62 in a head-to-tail relation. First manifold half 60 includes a first 64 and second 65 flange. Likewise, second manifold half 62 includes a first 66 and second 67 flange. Flanges 64, 65 of first manifold half 60 extend perimetrally substantially completely along the interior wall 68 of first shell half 14. Flanges 66, 67 of second manifold half 62 extend perimetrally substantially completely along the interior wall 68 of second shell half 16. Flanges 64, 65 66, 67 are coupled to the interior wall 68 by spot-welding or other conventional means. Preferably, the coupling of the flanges 64, 65, 66, 67 to interior wall 68 should be done so as to provide an airtight seal to prevent combustion product or air from flowing between interior wall 68 and the outwardly disposed surfaces of flanges 64, 65, 66, 67.

Preferably, the exteriorly concave ridges 30, 32 are spaced longitudinally on the shell half by a distance sufficient to permit flanges 64, 65, 66, 67 to be placed between adjacent ridges 30, 32. Although the flanges 64, 65, 66, 67 can be placed to overhang one of the ridges 30, 32, such placement of the flanges 64, 65, 66, 67 makes the spot-welding of the flanges 64, 65, 66, 67 more difficult.

The generally continuous interior wall 68, not having a neck-down portion, allows the positioning of the manifold 52 to be varied along a substantial portion of the interior wall 68. The longitudinal extent of the interior wall 68 upon which the manifold halves 60, 62 can be attached is greater than the longitudinal extent A of the manifold 52. Through the use of this arrangement, the manufacturer can adapt a single-sized converter 10 to fit a wide variety of applications.

First manifold half 60 includes a first 70 and second 72 inwardly disposed portion. Likewise, second manifold half 62 includes a first 74 and second 76 inwardly disposed portion. First and second manifold halves 60, 62 also include recessed portions 78, 80 having a means such as air holes 82, 83 for introducing air into the passageway 54 between the reducing catalyst 48 and the oxidizing catalyst 50.

Each manifold half 60, 62 also includes first, male mating sections 84, 86, respectively, and second, female mating sections 88, 90, respectively. As the manifold halves 60, 62 are disposed in a head-to-tail arrangement, the male mating section 84 of first manifold half 60 is disposed oppositely to the first, male mating section 86 of second manifold half 62. Each male mating section 84, 86 includes a male mating flange 94, 96 and a hollow stud 98, 100. Each female mating section 88, 90 includes a female mating flange 102, 104 having an aperture 106, 108. The hollow stud 98 of the male mating section 84 of first manifold half 60 is sized and positioned to be received by the aperture 108 of the female mating section 90 of second manifold half 62. Likewise, the hollow stud 100 of the male mating section 86 of second manifold half 62 is sized and positioned to be received by the aperture 106 of the female mating section 88 of first manifold half 60.

A fitting 114 is disposed on first shell half 14 and includes a port 116 through which air is introduced into manifold passageway 118. The position of the fitting can be varied longitudinally on the side surface of first 14 or second 16 shell half, depending on the particular converter being produced. Preferably, the fitting 114 is placed into a hole (not shown) which is formed in first shell half 14 during the stamping operation. Alternatively, the hole for the fitting 114 can be punched into the shell half 14 after the stamping operation is completed. Air introduced through port 116 into manifold passageway 118 flows through air holes 82, 83 into the passageway 54. To reach air hole 83, air can flow through apertures 106, 108 provided in the mating sections 84, 86, 88, 90.

Although the invention has been described in detail with reference to certain preferred embodiments and specific examples, variations and modifications exist within the scope and spirit of the invention as described and as defined in the following claims.

What is claimed is:

1. In a catalytic converter having a longitudinally disposed body portion comprising first and second shell halves having a wall defining an interior through which a combustion product can flow, the body having an inlet through which the combustion product can flow into the interior of the body and an outlet through which the combustion product can flow out of the interior of the body,
   a reducing catalyst disposed in the interior of the body proximal to the inlet,
   an oxidizing catalyst disposed in the interior of the body proximal to the outlet, and
   means for providing a passageway between the body interior containing the reducing catalyst and the body interior containing the oxidizing catalyst, the improvement comprising first and second manifold halves, each half including
   a pair of flanges extending perimetrally substantially completely around the interior wall of one shell half, the manifold flanges being disposed substantially parallel to the interior wall and coupled thereto,
   the manifold flanges including a portion recessed inwardly from the interior wall and first and second mating sections, the recessed portion including means for introducing air into the passageway between the reducing catalyst and the oxidizing catalyst,
   the first mating section including a stud, and the second mating section including an aperture, the aperture of said second mating section being sized and positioned to receive the stud of the first mating section,
   and wherein each shell half includes a portion of the interior wall for attaching the pair of flanges of the manifold halves, the portion having a greater longitudinal extent than the longitudinal extent of the pair of manifold flanges.

2. The invention of claim 1 further comprising a stud in the second mating portion and an aperture in the first mating portion, the aperture in the first mating portion being sized and positioned to receive the stud in the second mating portion.

3. The invention of claim 2 wherein the manifold halves are generally similar and disposed in a head-to-tail relation.

4. The invention of claim 1 wherein the said stud includes an opening to allow the air to flow through the opening in the stud and aperture which receives the stud.

5. The invention of claim 1, further comprising at least one exteriorly convex stiffening ridge formed into at least one of the first and second shell halves.

6. In a catalytic converter having a longitudinally disposed body portion comprising first and second shell halves having a wall defining an interior through which a combustion product can flow, the body having an inlet through which the combustion product can flow into the interior of the body and an outlet through which the combustion product can flow out of the interior of the body,
   a reducing catalyst disposed in the interior of the body proximal to the inlet,
   an oxidizing catalyst disposed in the interior of the body proximal to the outlet,
   means for providing a passageway between the body interior containing the reducing catalyst and the body interior containing the oxidizing catalyst, the improvement comprising first and second manifold halves, each half including
   a pair of flanges extending perimetrally substantially completely around the interior wall of one shell half, the manifold flanges being disposed substantially parallel to the interior wall and coupled thereto at a preselected location, the interior wall having a greater longitudinal extent than the longitudinal extent of the manifold flanges,
   the manifold flanges including a portion recessed inwardly from the interior wall and first and second mating sections, the recessed portion including means for introducing air into the passageway between the reducing catalyst and the oxidizing catalyst,
   the first mating section including a stud, and the second mating section including an aperture, the aperture of said second mating section being sized and positioned to receive the stud of the first mating section, and
   means providing a passageway through the wall for introducing air into the manifold halves.

7. The invention of claim 6 wherein the manifold halves are disposed closer to the inlet than to the outlet.

8. The invention of claim 6 wherein the manifold halves are disposed closer to the outlet than the inlet.

9. In a catalytic converter having a longitudinally disposed body portion comprising first and second shell halves having a wall defining an interior through which a combustion product can flow, the body having an inlet through which the combustion product can flow into the interior of the body and an outlet through which the combustion product can flow out of the interior of the body,
   a reducing catalyst disposed in the interior of the body proximal to the inlet,
   an oxidizing catalyst disposed in the interior of the body proximal to the outlet, means for providing a passageway between the body interior containing the reducing catalyst and the body interior containing the oxidizing catalyst, the improvement comprising first and second manifold halves disposed in a head-to-tail relation, each half including a pair of flanges extending perimetrally substantially completely around the interior wall of one shell half, the manifold flanges being disposed substantially parallel to the interior wall and coupled thereto at a preselected location, the interior wall having a greater longitudinal extent than the longitudinal extent of the manifold flanges, the manifold flanges including a portion recessed inwardly from the interior wall and first and second mating sections, the recessed portion including means for introducing air into the passageway between the reducing catalyst and the oxidizing catalyst, each first mating section including a stud, and each second mating section including an aperture, each aperture of said second mating section being sized and positioned to receive the stud of the first mating section, and means providing a passageway through the wall for introducing air into the manifold.

10. In a catalytic converter having a longitudinally disposed body portion comprising first and second shell halves having a wall defining an interior through which a combustion product can flow, the body having an inlet through which the combustion product can flow into the interior of the body and an outlet through which the combustion product can flow out of the interior of the body, a reducing catalyst disposed in the interior of the body proximal to the inlet, an oxidizing catalyst disposed in the interior of the body proximal to the outlet, and means for providing a passageway between the body interior containing the reducing catalyst and the body interior containing the oxidizing catalyst, the improvement comprising first and second manifold halves, each half including a mating portion, a pair of flanges extending perimetrally substantially completely around the interior wall of one shell half, the manifold flanges being disposed substantially parallel to the interior wall and coupled thereto, the manifold flanges including a portion recessed inwardly from the interior wall and first and second mating sections, the recessed portion including means for introducing air into the passageway between the reducing catalyst and the oxidizing catalyst, the mating portion of the first manifold half including a stud and the mating portion of the second manifold half including an aperture sized and positioned to receive the stud of the first manifold half.

* * * * *